Dec. 22, 1925.  R. L. CARTER  1,566,373
ROUTER BIT
Filed March 18, 1925
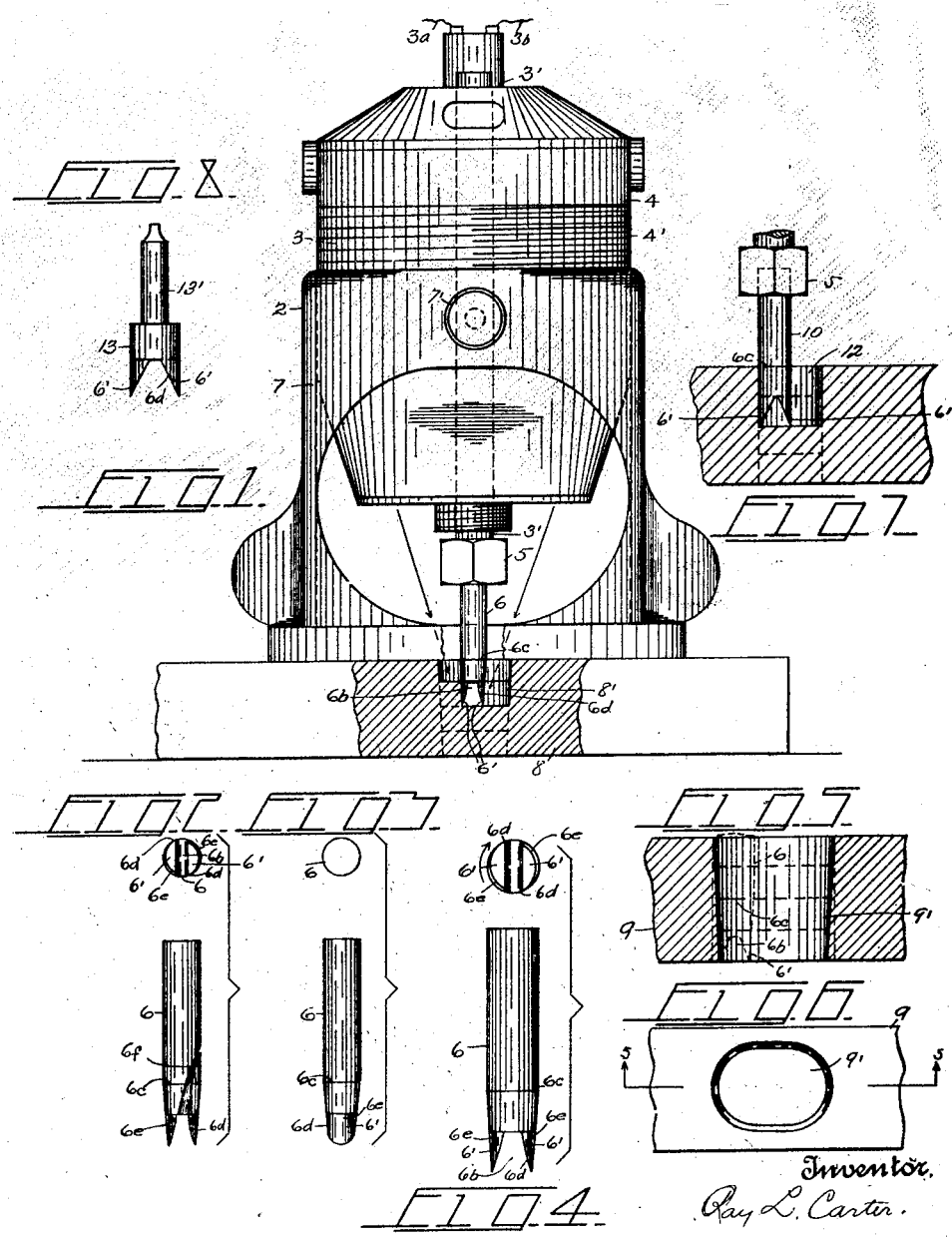
Inventor.
Ray L. Carter.
By Harry D. Wallace.
Attorney.

Patented Dec. 22, 1925.

1,566,373

UNITED STATES PATENT OFFICE.

RAY L. CARTER, OF SYRACUSE, NEW YORK.

ROUTER BIT.

Application filed March 18, 1925. Serial No. 16,555.

*To all whom it may concern:*

Be it known that I, RAY L. CARTER, a citizen of the United States, residing at Syracuse, in the county of Onondaga and State of New York, have invented certain new and useful Improvements in Router Bits, of which the following is a specification.

This invention relates to routing and boring machines generally, and has an especial reference to tools operated by said machines.

The primary object of the invention is to provide a novel bit or tool, for routing and boring machines, by means of which tapered holes, mortises, socket and cavities, may be made, in a simple manner, without requiring any extra attachments or parts for aiding the tool. A further object is to provide a routing bit, which is formed with a tapered portion adjacent its cutting edges, which acts as a guide for controlling the action of the bit, as the latter cuts its way deeper and deeper into the work. And a further object is to provide means for preventing choking of the bit, by facilitating the escape of the chips and dust.

I attain these objects by the means set forth in the detailed description which follows, and as illustrated by the accompanying drawing, in which—

Figure 1 is a front side elevation of one type of routing machine, showing my improved bit in operation. Fig. 2 is respectively a bottom-end and an edge view of the bit. Fig. 3 is a similar view of the top end and one side of the bit. Fig. 4 is an enlarged top and side view of the bit shown in Fig. 2. Fig. 5 is a central vertical section, taken on line 5—5 of Fig. 6, showing a piece of work in which a tapered hole has been formed by the bit. Fig. 6 is a top plan view of the same. Fig. 7 is a view showing a straight-out bit for routing or mortising oval or other elongated mortises or cavities having parallel walls. Fig. 8 is a modified view of a straight-out tool.

In the drawing, 2 represents a routing machine comprising a motor 3, having an armature shaft 3', the motor being entirely enclosed in a casing 4, which is externally threaded, as at 4', for adjusting the motor vertically relatively to the planes of various work. The motor may be driven by any suitable means, as by electric current, supplied by wires $3^a$—$3^b$. The armature shaft 3' extends below the casing 4, and is fitted with a hexagon chuck 5, which is employed for adjustably supporting the routing bit or tool, as 6. The motor is supported by an upright hollow cylindrical holder 7; which is preferably internally threaded in its upper portion for adjustably receiving the motor casing 4. The motor may be locked in the holder 7, for repeating the operations of the routing bit, by means of a set screw 7', which is threaded through one side of the barrel of the holder, as shown in Fig. 1. The motor is preferably equipped with cooling means (not shown), and the air for effecting the cooling, is drawn through openings in the conical top of the shell 4, and is discharged through suitable openings in the bottom of the casing, by means of a fan (not shown), the said bottom being arranged to direct the air downwardly in converging jets, as shown by the arrows in Fig. 1, for blowing chips and dust from the vicinity of the bit 6, during the process of the work. The routing machine is shown mounted upon a piece of work 8, and the tool is shown in the act of routing a tapered mortise or cavity 8'.

The bit 6 comprises a round steel rod or body, one end thereof being plain and adapted to be inserted in the chuck 5. The opposite end of the bit is formed with similar cylindrical cutting spurs 6', which are preferably disposed diametrically opposite each other, the said spurs being spaced by cutting away longitudinally the central portion of the body, as at $6^b$. The said spurs are preferably tapered and formed with sharp cutting bottom edges which are preferably round, as best seen in Fig. 3. The lower end portion of the bit is tapered from a circumferential line $6^c$, the said tapered portion embracing the spurs 6'. Above the line $6^c$ the body of the bit is preferably of normal diameter. One vertical edge, as $6^d$, of each spur preferably extends truly in the line or plane of the said taper, so that the said edge may effect lateral cuts the depth of the spurs to the said line. From the sharp vertical edges 6ᵈ, the spurs are preferably ground or "backed off" circumferentially, as indicated by the spiral lines 6ᵉ (see end views in Figs. 2 and 4), for affording suitable clearance or freedom for the cutting edges 6ᵈ. Some of the bits 6 are formed with a spiral circumferential groove as 6ᶠ (see Fig. 2), for affording escape for the chips and dust while the bit is in operation. In practise, the bits are formed with certain standard tapers, which may be changed at will, by the operator, by simply grinding the bits circumferentially. In this way, any desired taper may be effected in a few minutes time. One of the common uses to which my tapered bit is put, consists of the routing or cutting of tapered holes, mortises or cavities, for patterns, and the like, in which the taper is necessary in order that the patterns may be withdrawn from the casting molds. Such a tapered hole is shown in a piece of work 9, as at 9', in Figs. 5 and 6. In this showing, the hole 9' is oval and the taper is suitable for pattern withdrawal. In routing relatively deep sockets, as shown in Figs. 1 and 5, the bit 6 is preferably lowered, by adjusting the motor in the holder sufficiently, to effect cuts whose depths substantially equal the length of the spurs 6', which according to the drawing is about one-quarter of an inch (see horizontal lines in Figs. 1, 5 and 7). The routing of sockets or mortises like those shown in the drawing, is usually effected in three or four stages: The first stage effecting the excavation of the full area of the socket, to the extent of the length of the spurs 6'. In effecting this first stage of the routing, the operator starts the cutting substantially in the center of the outline of the socket, then he maneuvers the router, preferably in a circular direction, until the bit removes all of the material within the profile of the socket for the depth of the said stage. When the first stage is completed, the operator again starts the bit at the center of the excavation and forces it downwardly to the normal depth of the spurs 6', and again maneuvers the bit for cutting outwardly and circularly, until the tapered portions of the bit between the line 6ᶜ and the spurs make contact with the tapered walls of the socket, that had previously been formed by the spurs during the first routing stage. This causes the bit to form new wall portions at the end of the second stage in line with and substantially at the same taper. The third and fourth stages indicated by dotted lines in Fig. 5, are carried out in the same manner, cutting by the bit at the end of the succeeding stages being controlled entirely by the tapered portion of the shank above the spurs 6' encountering the tapered walls formed by the preceding stage of the routing, with the result that when the final stages of the routing is effected, the whole of the mortise tapers regularly from top to bottom as shown in Fig. 5, and during this routing work the longitudinal cutting edges 6ᵈ of the bit effect a smoothing of the walls of the socket, to such extent that sanding or other smoothing or polishing work is unnecessary.

In the Figs. 7 and 8, the bit 10 is formed "straight-out", for its whole length, and is shown in the act of routing an elongated mortise 12, whose walls are parallel. Otherwise the bit 10 is practically the same, as the bit 6. In Fig. 8 is shown a slight modification, which consists of reducing the upper portion of the body of the bit 13, as at 13'. This is done principally for minimizing the friction contact of a relatively long body with the walls, when the bit is employed for forming deep mortises.

Having thus described my invention, what I claim, is—

1. In a router bit, a solid cylindrical body having a normal diameter for the greater part of its length, below said normal diameter said body being formed with a tapered guide portion and below said tapered portion said body being cut away in the line of its axis and at the opposite sides of the opening so formed said body being formed with V-shaped semi-cylindrical spurs, each of said spurs having a sharp cutting edge extending longitudinally and being disposed in the plane of said tapered portion, and the free end of said spurs being round and sharp.

2. In a router bit, a cylindrical shank, one end of said shank being formed with similar spaced V-shaped cutting spurs, said spurs being semi-cylindrical and each having one sharp edge that is disposed in the plane of the circumferential surface of the shank, said spurs adjacent their attached ends being "backed-off" for affording clearance while the sharp edges are effecting the cutting, said shank from the tips of said spurs towards its middle being tapered relatively to the remainder of the shank a portion of said taper being plain and serving for a guide for effecting the routing of tapered mortises, sockets and the like.

3. A router bit comprising a cylindrical body, one end portion of the bit being plain and of normal diameter, the other end portion being tapered, the tapered end portion being formed for a part of its length with spaced cutting spurs, one on each side of the longitudinal axis of the body, adapted when the bit is rotated to cut a circular path, the corresponding longitudinal edges of said spurs being sharp, and being disposed in the plane of the tapered portion of the body, adapted to form mortises by a succession of cutting stages and to maintain the same taper of the walls of the mortise throughout the several cutting stages with smooth tapered walls.

4. A routing tool comprising a cylindrical body formed at one end with spaced cutting spurs, the circumferential faces of said spurs having spiral formation, the corresponding longitudinal edges of said spurs being sharp and adapted to cut in a vertical plane, the free ends of said spurs being round and sharp and adapted to cut circularly in a common path, the said body being tapered towards the free ends of said spurs, the tapered portions above said spurs adapted to control and gage the cutting of relatively deep sockets by a number of stages and to effect the same taper of the walls of the sockets throughout the said stages with tapering walls by said longitudinal edges.

In testimony whereof I affix my signature.

RAY L. CARTER.